PTH38 XR 3,833,999

United States Patent [19]

Budych et al.

[11] 3,833,999

[45] Sept. 10, 1974

[54] METHOD OF ADJUSTING FREQUENCY OF VIBRATOR STRUCTURE

[75] Inventors: Irvin Budych, Lake Geneva; LaVerne Lawrence Frey, Delavan, both of Wis.; William Edward Reefman, Santa Barbara, Calif.

[73] Assignee: Bunker Ramo Corporation, Oak Brook, Ill.

[22] Filed: May 24, 1973

[21] Appl. No.: 363,324

Related U.S. Application Data

[62] Division of Ser. No. 220,357, Jan. 24, 1972, Pat. No. 3,759,133.

[52] U.S. Cl. .................... 29/407, 29/25.35, 29/596, 84/457

[51] Int. Cl. .................................... B23q 17/00

[58] Field of Search .......... 29/407, 25.35, 596, 177, 29/178; 219/121 LM, 121 L; 58/23 TF; 310/25; 331/156

[56] References Cited

UNITED STATES PATENTS

| | | | |
|---|---|---|---|
| 2,732,748 | 1/1956 | Grib | 84/457 |
| 3,230,614 | 1/1966 | Rasch | 29/407 X |
| 3,462,939 | 8/1969 | Tanaka et al. | 84/457 X |
| 3,636,810 | 1/1972 | Reefman | 84/457 |
| 3,760,482 | 9/1973 | Kawamura | 29/177 X |

*Primary Examiner*—Richard J. Herbst
*Assistant Examiner*—Victor A. Di Palma
*Attorney, Agent, or Firm*—D. R. Bair; F. M. Arbuckle

[57] ABSTRACT

A method and apparatus for tuning and adjusting the frequency of a vibrator structure such as a tuning fork of the type formed from a single strip of low molecular loss material. Tuning is effected by bending one or more of the tines of the fork or preferably by bending an ear formed for this purpose on a tine. In the alternative, the frequency may be controlled by selectively removing material from an ear.

In order to maintain the balance of the structure it is desirable that tuning be performed on both tines of a fork. A preferred method for performing the tuning involves forming the structure in a manner such that its frequency is always lower than required. This frequency is then measured and half the difference in frequency is corrected by bending ears formed on an outer tine. Material is then removed from an inner tine by, for example, burning the material off with a laser, to raise the frequency to the desired value.

13 Claims, 10 Drawing Figures

METHOD OF ADJUSTING FREQUENCY OF VIBRATOR STRUCTURE

This is a division, of application Ser. No. 200,357 filed Jan. 24, 1972, now U.S. Pat. No. 3,759,133.

This invention relates to a method and apparatus for adjusting the resonant frequency of a vibrator fork having a particular structure and to a vibrator fork structure having provision for the tuning thereof.

BACKGROUND

In U.S. Pat. No. 3,636,810 entitled "Tuning Forks and Oscillators Embodying the Same" issue Jan. 25, 1972 to William E. Reefman and assigned to the assignee of the present application, a novel tuning or vibrator fork structure is disclosed. This vibrator fork structure consists of a flat, thin rectangular strip of a low molecular loss material with a generally U-shaped aperture formed in it. The aperture divides the upper portion of the strip into an inner tine surrounded by a generally U-shaped outer tine.

While theoretically it is possible to calculate the dimensions for the structure described above such that the natural resonant frequency for each vibrator fork which is stamped will be equal to a selected frequency within extremely small tolerances, as a practical matter, variations in material thickness of the raw stock from which the forks are stamped cause considerable variation in the frequency of the forks. Therefore, in applications such as the driving of an electric clock, where accurate operation requires precise tuning of the fork, adjusting of the fork frequency is required after stamping.

In performing the tuning of the fork, several considerations must be borne in mind. First, it is noted that the frequency of the fork may be increased by removing mass from the tines or by changing the center of mass of the tines toward the throat or base of the structure, while conversely, the frequency may be lowered by adding mass to the tines or by moving the center of mass away from the base. However, in order to maintain high "Q" (low loss) for the fork, balance between the two tines should be maintained. A technique for making a significant adjustment in the tuning of the vibrator fork should thus involve changes in mass and/or center of gravity on both tines in order to maintain the balance of the structure. The technique utilized should also leave no mechanical stresses in the fork as would be the case if material was removed by grinding or drilling and should be relatively fast, inexpensive, and accurate. Accuracy is achieved by permitting changes in mass or center of gravity to be made in small increments.

Another factor to be considered is that in use, and over a period of time, small changes may occur in the resonant frequency of a fork. This could, for example, cause a clock in which the fork is being utilized to run fast or slow. The fork structure should thus provide a relatively simple and inexpensive means for making slight adjustments in the frequency of the fork in the field.

It is therefore a primary object of this invention to provide a method and apparatus for tuning vibrator forks of the type indicated above.

Another object of this invention is to provide a novel fork structure uniquely adapted to be tuned.

A more specific object of this invention is to provide a method and apparatus of the type indicated above which permits the tuning to be performed rapidly, accurately and inexpensively without introducing mechanical stresses into the fork structure.

Still another object of this invention is to provide a method and apparatus of the type indicated above which permits the resonant frequency of the fork to be adjusted in the field.

SUMMARY

In accordance with these objects, this invention provides a method and apparatus for tuning or adjusting the frequency of a vibrator structure having first and second tine members and a base. The tine members and base each have their major surface areas normally lying in a substantially common plane. The first tine member is generally U-shaped and surrounds the second tine member. Tuning ears may be formed on at least one of the tine members. The center of gravity of a tine is lowered, utilizing the teachings of this invention, by bending either the entire tine, or preferably the ear formed thereon, at an angle to the common plane, the angle at which the ear is bent being determined by the resonant frequency to which the structure is to be tuned.

In order to maintain the balance of the structure, it is desirable that the tuning be performed on both tines. A preferred method for performing the tuning involves forming the structure in a manner such that its frequency is always lower than required. This frequency is then measured and half the difference in frequency is corrected by bending ears formed on the outer tine. Material is then removed from the inner tine by, for example, burning the material off with a laser to raise the frequency to the desired value.

The foregoing and other objects, features and advantages of the invention will be apparent from the following more particular description of preferred embodiments of the invention as illustrated in the accompanying drawings.

DESCRIPTION OF VIBRATOR FORK STRUCTURE

Figure 1:
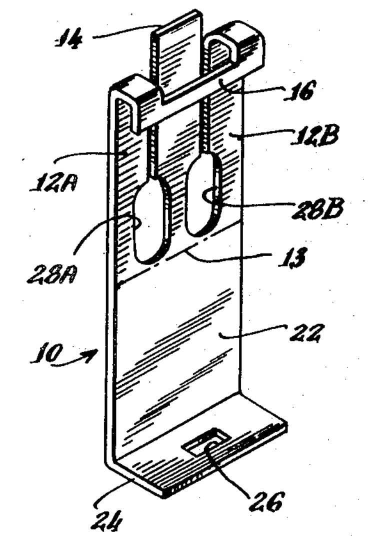
FIG. 1 is a perspective view of a tuning or vibrator fork structure of the general type utilized in this invention.

FIG. 1 shows a vibrator structure of the type disclosed in the beforementioned Reefman copending application. The fork which is generally indicated by the reference numeral 10, is formed of a thin (normally 10-thousandths of an inch) strip of low molecular loss material such as NiSpanC. It may be fabricated by stamping, which is the preferred method, chemically milling, etching, or electro-forming methods. By these same methods, a relatively thin strip of material is removed from the fork to form a first inner tine 14 which is surrounded by another tine 12 made up of spaced apart side arms 12A and 12B with a connecting leg 16 therebetween, both tines extending from the generally rectangular base section 22 for vibration relative thereto generally along the line 13. A mounting flange 24 having a mounting hole 26 may be provided at the bottom of base 22. For preferred embodiments of the invention, apertures 28A and 28B are provided just above the upper portion of fork base 22. These apertures relieve the center tine member 14 of more material than they do the legs 12A and 12B of the outer tine member 12. As indicated in the beforementioned Reefman application, this tends to increase the compliance of the coupling between the center tine member 14 to the base 22 thus reducing its self-resonant frequency while at the same time reducing further the self-resonant frequency of the outer tine member 12 so as to permit the realization of very low fork frequencies for a given set of fork dimensions. Stated another way, apertures 28 tend to raise the center of gravity of both tines thus lowering the resonant frequency of the structure. Since the center of gravity of tine 12 is normally higher than that of tine 14, more material is removed from the center tine to balance the structure.

In FIG. 1 the upper portion of outer tine 12 is shown as being bent over at an angle to the plane of fork 10. This further lowers the center of gravity of outer tine 12, raising the frequency of this tine and of the total fork structure. The bending over of outer tine 12 may thus be utilized either in addition to or instead of the dissymetry of material in the throat areas of the center and outside tines caused by apertures 28 to reestablish balance between the tines. Further, since the bending of the outer tine down tends to raise the frequency of the fork, and the bending of this tine up tends to lower the frequency of the fork, it is apparent that the bending of the tine may be utilized to tune or adjust the fork's resonant frequency.

While tuning of the fork is possible with the structure shown in FIG. 1, the bending of the entire width of tine 12 results in a relatively large amount of mass being moved and thus in relatively large changes in the position of the tine center of gravity. This results in relatively large changes in the resonant frequency of the fork in response to relatively small changes in the angle at which the tine is bent. Stated another way, the structure shown in FIG. 1 is adapted to provide only course adjustments in frequency. Thus, while the embodiment of the invention shown in FIG. 1 illustrates a basic concept of the invention and is suitable for balancing and rough tuning of the fork, it is not ideally suited for applications where fine tuning of the fork frequency is required.

Figure 2:
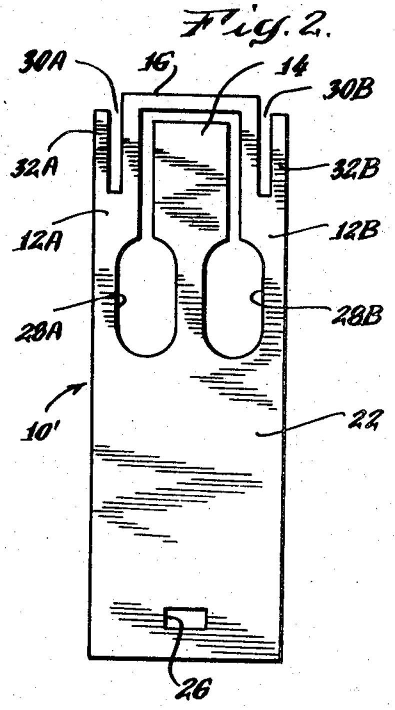
FIG. 2 is a front view of the tuning fork structure for a preferred embodiment of the invention prior to tuning.
Figure 3:
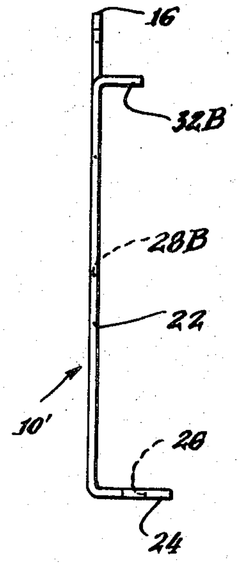
FIG. 3 is a side view of the structure shown in FIG. 2 after tuning.

FIG. 2 illustrates a modified tuning fork structure 10' which, in addition to all of the elements shown in FIG. 1, also has an additional slot 30 stamped or otherwise formed in the upper corners of tine 12. Each slot 30 separates a tuning ear 32 from the remainder of the tine. While exact dimensions would vary with material, the frequency range for which the fork is designed, and the like, for a preferred embodiment of the invention, the width of each ear 32 is slightly greater than one-third the width of the tine, and the width of slot 30 is slightly less than one-third the width of the tine. As will be described in greater detail later, tuning of structure 10' may be effected by either bending ears 32 as, for example, shown in FIG. 3 or by removing material from the ears.

Figure 4:
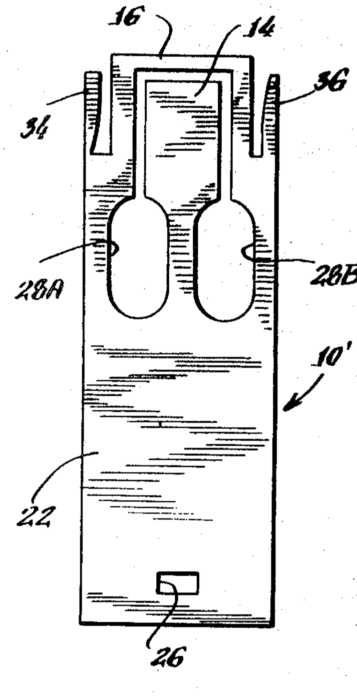
FIGS. 4, 5 and 6 are front views of blanks for alternative tuning fork structures suitable for use with this invention.
Figure 5:
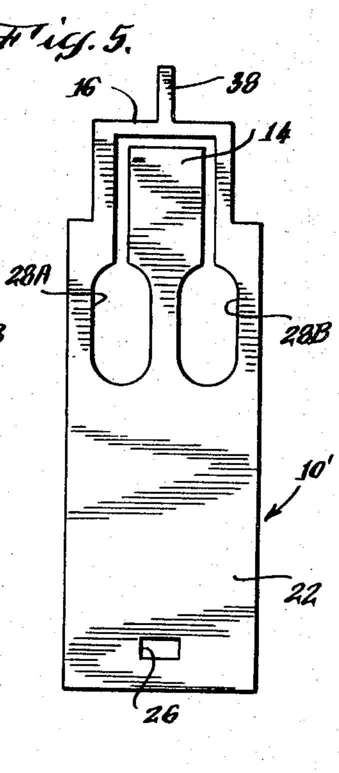
Figure 6:
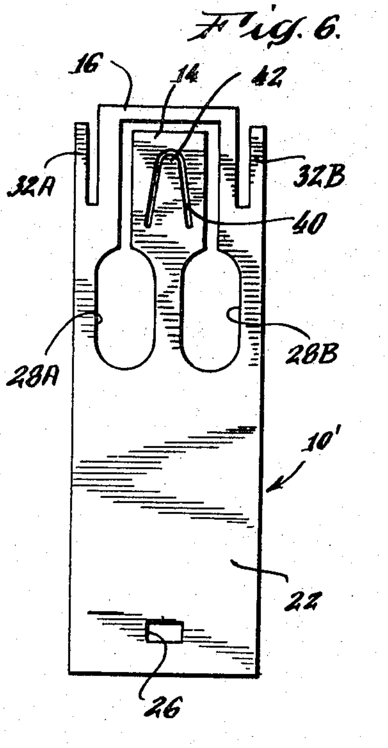

FIGS. 4, 5 and 6 show other alternative embodiments of the invention. The structure 10' of FIG. 4 differs from that shown in FIG. 2 in that ear 34 is larger at its top than at its base while ear 36 is larger at its base than at its top. The design of ear 34 concentrates the mass of the ear away from base 22 and thus provides a greater change in the center of gravity of the tine, and thus in frequency, for each degree change in the angle at which the ear is bent than does the ear 32A. Ear 34 thus permits tuning over a wider range. However, ear 34 also provides coarser tuning and extreme care must be exercised in designing an ear of this type to assure that undesired harmonics are not produced.

Ear 36 is the converse of ear 34 and, having its mass concentrated nearer base 22, produces relatively small changes in frequency for each degree of bend. This ear thus provides finer tuning of the structure than is possible with, for example, an ear 32. While ears 34 and 36 have been shown on the same structure in FIG. 4, this is for illustrative purposes only and in most instances, a structure would have ears of only a single shape (i.e. ear 32, 34 or 36).

In FIG. 5, material has been removed from the upper corners of tine 12 to provide balance between tines 12 and 14, and a single tuning ear 38 is provided. The structure shown in FIG. 5 has the advantage of requiring the adjustment of only a single ear for tuning purposes. It is therefore easier to tune with this structure, and there is less likelihood of an imbalance resulting from ears being bent at different angles. It would also be easier to stamp a structure of this type. However, this structure results in a longer fork and may cause harmonic generation. More seriously, stamping this structure results in a substantial quantity of wasted stock.

In FIG. 6 an inverted U-shaped aperture 40 is formed in center tine 14 to define an ear 42 therein. While an ear 42 in conjunction with ears 32 may be utilized to maintain balance while performing tuning by bending alone, the tuning methods to be now described have normally been found to be preferable. However, the structure shown in FIG. 6 would be useful where sufficiently large frequency changes are being made in the field so that an unbalancing of the tines could be a problem.

Figure 7:
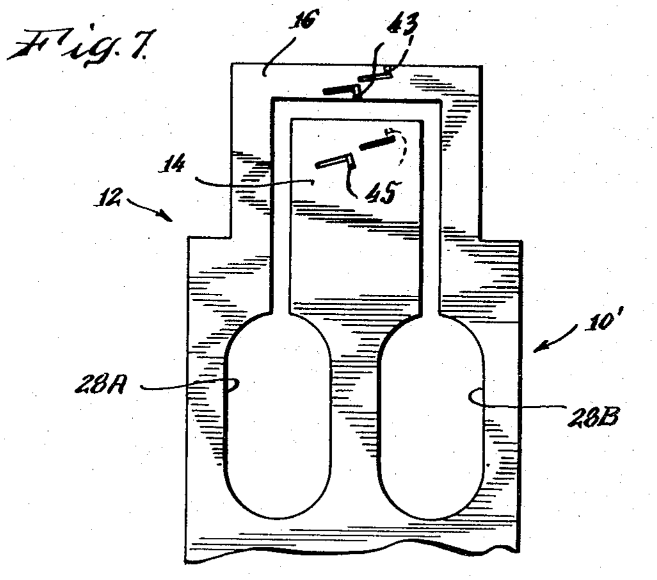
FIGS. 7 and 8 are partial front and side views respectively of another alternative embodiment of the invention.
Figure 8:
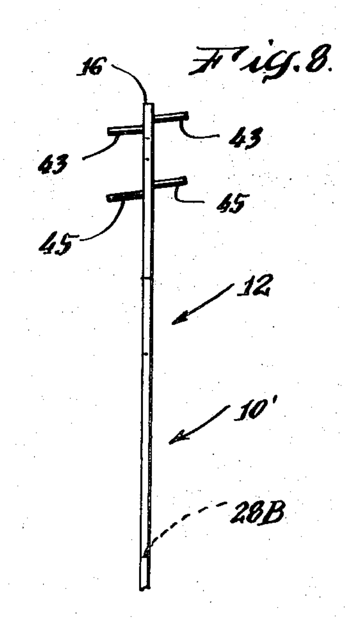

FIGS. 7 and 8 show still another alternative embodiment of the invention. For this embodiment of the invention, a pair of ears or tabs 43 are shown stamped from connecting arm 16 of outer tine 12 and a pair of ears 45 are stamped in center tine 14. The tines 43 and 45 are stamped at small angles to the horizontal. This arrangement provides a small change in the center of mass for a given angular change in ear position and may thus be used for vernier tuning of the fork. The two ears of each pair of ears 43 and 45 are at different angles to provide coarse and fine tuning. The ears of each pair are also bent in oppsoite directions from the fork common plane to preserve the center of mass of the fork. While in FIGS. 7 and 8, two ears have been stamped from each of the tines, it is apparent that vernier tuning could be obtained by having one or more angled ears on either or both tines.

DESCRIPTION OF TUNING METHOD

In the discussion to follow it will be assumed that the fork structure being tuned is of the type shown in FIG. 2 and that the fork, which is to be utilized to control a clock, is to have a precise resonant frequency of 480Hz. Since bending ears 32 down, or removing material either from ears or tines all tend to raise the frequency of the fork, and since it is easier and less expensive to remove material from a tine than to add material to a tine, the initial dimensions of the stamped fork 10' are selected such that the freuency of the fork will always have to be adjusted upward. Thus, the median frequency chosen is such that, when tolerances are considered, the highest frequency fork would still be below 480Hz.

Figure 10:
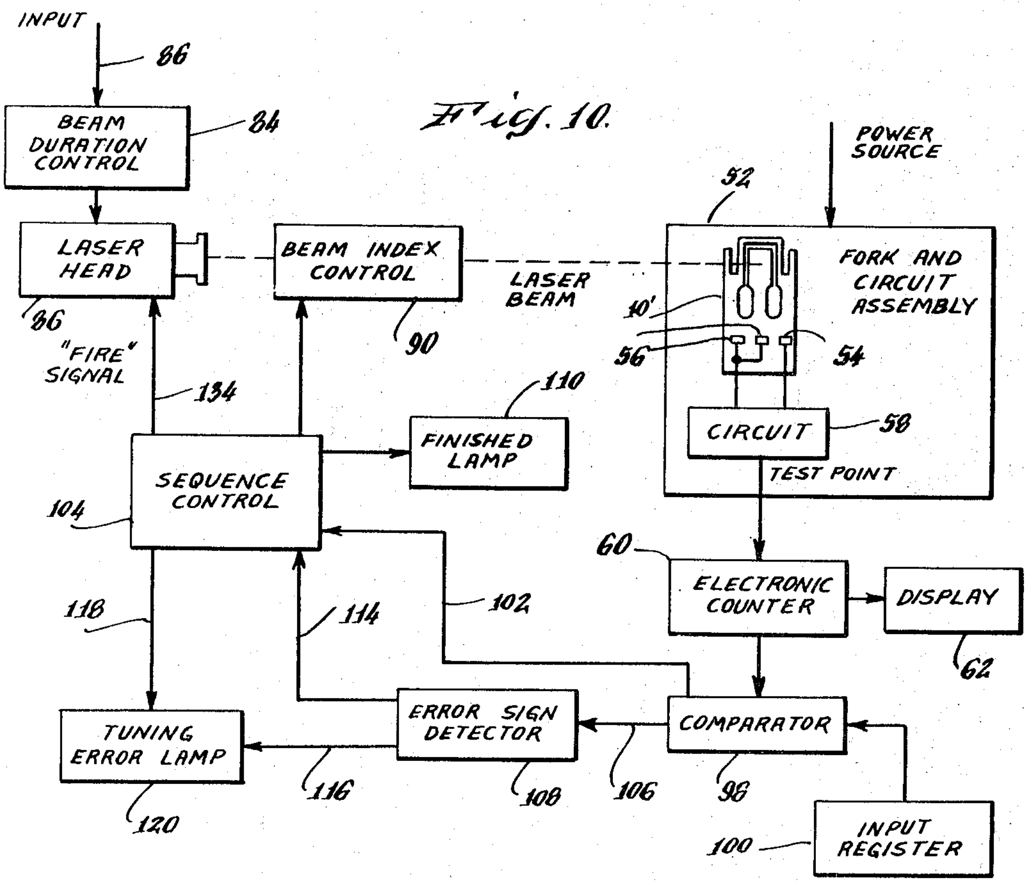
FIG. 10 is a schematic semi-block diagram of a system suitable for use in adjusting the frequency of the tuning fork structure shown, for example, in FIG. 2.
Figure 9:
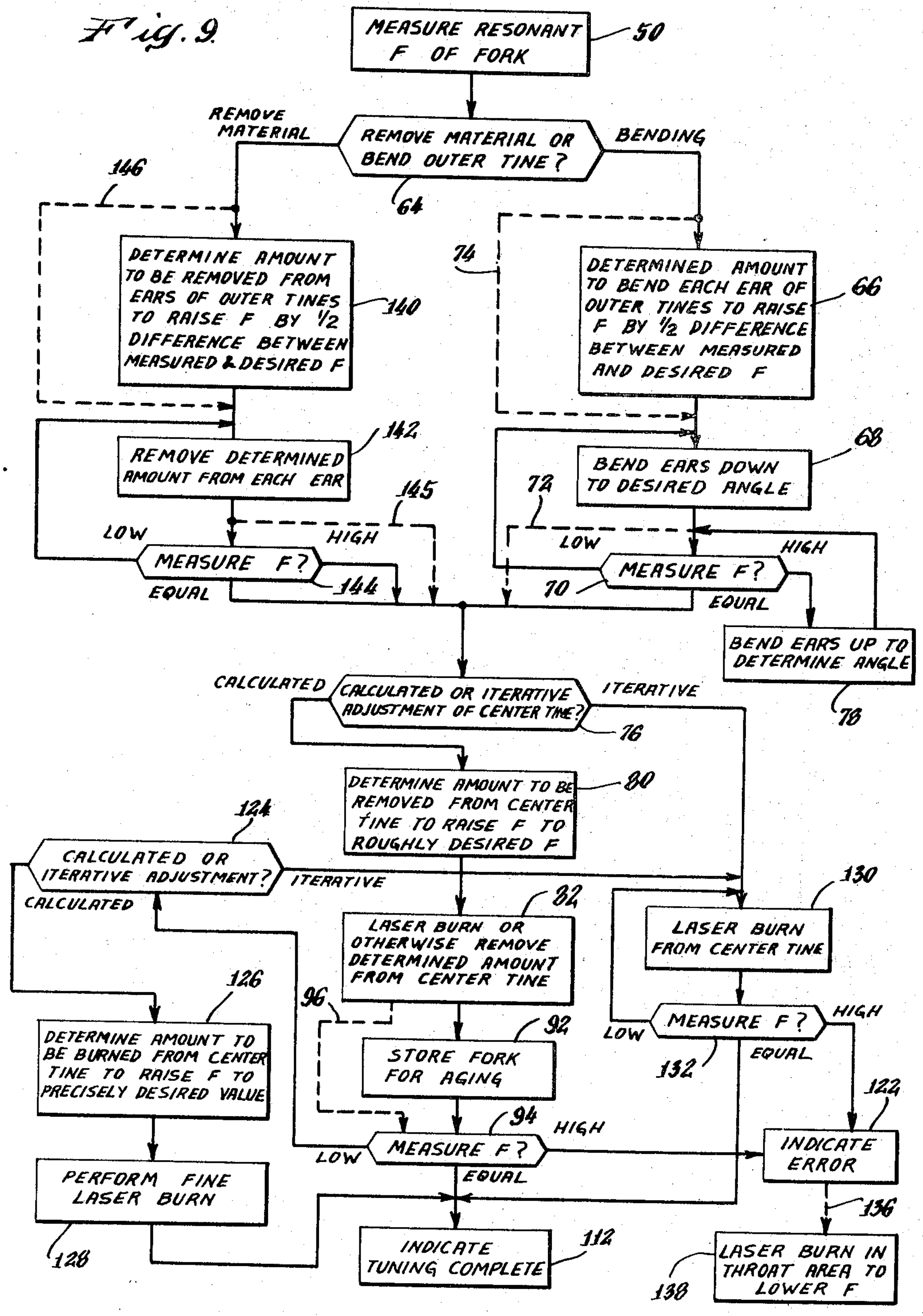
FIG. 9 is a flow diagram of the method utilized to adjust the frequency of a tuning fork structure for preferred embodiments of the invention.

Referring now to FIGS. 9 and 10, it is seen that the first step in the tuning operation, step 50, is to measure the resonant frequency of the fork. While a separate circuit could be provided for mounting, energizing, and sensing the frequency of the fork, it is preferable that the fork be mounted in its final assembly and have its transducers attached prior to the tuning operation. In addition to eliminating the need for an extra running circuit for tuning purposes, this also eliminates the possibility of different circuit parameters altering the frequency after tuning is completed. FIG. 10 shows a fork and circuit assembly 52 which includes the fork 10' having an energizing transducer 54 and sense transducers 56 attached thereto in the manner described in the before-mentioned Reefman application. Transducers 54 and 56 are connected to an integrated circuit 38 which controls the inputs and outputs from the fork. This circuit has a test point output which is connected as an input to electronic counter 60.

While it is really the frequency of the fork which is of interest, the period of the fork, or the reciprocal of the frequency, can be determined to a much greater degree of accuracy in a very short measurement time. Thus, to conserve reading time and maintain precision, period rather than frequency will actually be measured during step 50 and the other frequency measuring steps of the operation.

Referring again to FIG. 10, the period of the fork is simply determined by circuit 58 permitting counter 60 to start incrementing at a predetermined point in a vibration cycle of fork 10' and terminating the incrementing of the counter at the same point one or more cycles later. A display 62 is provided to indicate the period count in counter 60.

From FIG. 9, the next step in the operation, step 64, is a decision step during which an election is made as to whether tuning on outer tine 12 is to be performed by bending ears 32 or by removing material from these ears. Assume initially that the ears are to be bent in order to perform the tuning of the outer tine. Under these conditions, the operation branches from step 64 to step 66 during which a determination is made of the angle to which the ears must be bent in order to raise the frequency of the fork 10' by one-half the difference between the measured and desired frequency. For example, if the measured frequency is 470Hz and the desired frequency is 480Hz, the ears would be bent sufficiently to raise the frequency to 475Hz. The determination of step 66 is not critical since the ultimate frequency of the fork is determined by the fine tuning step to be described later rather than by this rough tuning step so that the accuracy of this rough tuning step only affects the balance of the tines. Since Q is a rather shallow function of the unbalance of the tines, a reasonably large frequency error arising from this tuning operation can thus be tolerated.

When step 66 has been completed, the operation proceeds to step 68 during which the ears are each bent to the determined angle. This would normally be done in a bending jig with the operator initially setting the desired amount of bend on a dial. This sets stops on the jig bending fingers. Both ears would normally be bent simultaneously and by the same amount. The ear bending may be performed with the fork mounted in its circuit assembly as shown in FIG. 10.

At this point it should be noted that the change in frequency is not a linear function of the angle of bend but, instead, varies as a cosinusoidal function of the angle. Thus, for bend angles near 180°, there is a relatively small change in fork frequency for each degree that the ear is bent; whereas, near 90°, the frequency change per degree of bend is greater.

The next step in the operation, step 70, normally involves the remeasuring of the fork frequency. If the level of confidence in the accuracy of the bending operation is sufficiently high, measuring step 70 may be bypassed (see line 72). Normally, the only function of measuring step 70 is to indicate the actual frequency of the fork after the bending operation so as to permit the calculations for the next tuning step to be more accurately performed. However, if the calculations for the bend are initially rough or, if as is indicated by line 74, these calculations are dispensed with completely, it may be necessary to make further adjustments after the initial bending. Under these conditions, the system would branch from step 70 to the next step in the operation, step 76, only if the measured frequency is equal to the desired half-way-between frequency within a fairly wide tolerance. If the frequency is lower than desired by greater than the permitted tolerance, the operation returns to step 68 for an additional bending operation, while if the ears are initially bent by too much, so that the frequency is too high by an amount greater than the permitted tolerance, the system would branch to step 78. During step 78 the ears would be bent up slightly to lower the frequency to within the desired tolerance range.

When the ears have been bent to the proper angle, normally as a result of a single calculated bend, a decision must be made during step 76 as to whether material is to be removed from the center tine by a calculated or an iterative procedure. Since an initially large amount of material would normally be removed from the center tine, it would be difficult and extremely slow to remove such an amount of material without causing severe transient conditions to develop in the fork. The accurate measurements required for the iterative procedure would therefore be difficult to perform, causing the calculated procedure to be perferred.

Assume therefore that the system branches from step 76 to step 80 during which a calculation is performed to determine the amount of material to be removed from the center tine to raise the frequency of the fork to roughly the desired value. Because of the impossibility of making accurate measurements when a large amount of material is being removed from the tine, the amount of meterial to be removed would be calculated to cause the frequency to be as near as possible to the desired frequeny without being greater than this frequency. This would minimize the amount of material which is to be removed during a fine tuning operation to follow. During the next step in the operation, step 82, the determined amount of material is removed from center tine 14. While for the rough tuning of step 82, material may be removed by punching, grinding, drilling, or other similar procedures, the preferred method for this step is to burn the material from the tine with a laser. From FIG. 10, beam duration control 84 would be set by a manual input on line 86 and laser 88 would then be fired. For the initial course burn, the beam index control 90 would be set for maximum beam strength. Either laser head 88, the beam index control 90, or the support on which assembly 52 is mounted could be moved slightly during the laser burn operation to scan the beam across the tine permitting material to be removed over an area rather than a single spot. Since a fair amount of material is removed during the course burn, it takes about 10 to 15 seconds and causes considerable transient conditions to develop in the fork, making frequency readings impossible during the burn and for a short time thereafter.

Because of the transient conditions indicated above, the fork is normally stored for aging (step 92) before an attempt is again made to measure the frequency of the fork (step 94). In addition to transients introduced by the laser burn, this aging also permits stresses introduced by the bending of the tabs, any cutting, and from the attaching of transducer crystals 54 and 56 to the fork to subside. Aging step 92 thus permits for the settling down of all the stress and other initial transient conditions. The duration of this settling operation would vary depending on the material utilized and other factors and could range from several hours to several days. As indicated by dotted line 96, it is possible under some conditions that the aging step could be eliminated completely.

After transients have settled, the frequency of the fork is again measured (step 94). Referring now to FIG. 10, during the measuring operation the period of the fork is recorded in electronic counter 60. This count is compared in comparator 98 with the period for the desired frequency which is stored in register 100. An output which represents the magnitude of the difference between the measured period and the desired period stored in register 100 is applied through output line 102 from comparator 98 to sequence control circuit 104. A signal representing the sign of this difference is applied through output line 106 from comparator 98 to error sign detector 108. If the magnitude of the error on line 102 is below a predetermined amount, this means that the tuning operation has been completed. Under this condition, sequence control 104 terminates any further operations and causes finished lamp 110 to be ignited (step 112). If the error is above the predetermined amount, and is negative, the signal on line 102, in conjunction with a signal on line 114 from circuit 108, causes sequence control 104 to terminate the operation. In addition, a signal on lines 116 from detector 108 and on line 118 from sequence control 104 cause a tuning error lamp 120 to be ignited (step 122).

Finally, if during step 94 it is determined that the error is greater than a predetermined amount and is positive, the decision of step 124 must be made. It is possible at this point to calculate the amount of fine adjustment in the mass of the center tine required to raise the frequency to precisely the desired value (step 126) and to then perform a fine laser burn (step 128) to remove this amount of material from the tine. As shown in FIG. 10, this would be accomplished by either manually determining the required burn and setting in the duration control 84 and/or index control 90 to remove the determined quantity of material; or, as shown in the figure, by permitting sequence control 104 to calculate the strength of the beam required with a fixed duration burn in response to the magnitude of the error signal line 102. Since a relatively small quantity of material is removed in this instance, it should be possible to remove the required amount of material without requiring a remeasurement so that finished lamp 110 could be lighted when the fixed duration burn is completed (step 112). Otherwise, the process could return to measuring step 94 from step 128, and the sequence of operations described above repeated.

While the system could branch to step 126 from step 124, it has been found that because of the small amount of burning required during the fine tuning operation, large thermal transient problems do not exist during this burn, and accurate measurement can be performed while the burn is being conducted. It is therefore preferable to branch from step 124 to step 130 during which a low-strength laser burn is performed. At the same time that this burn is being performed, the measuring operation of step 132 is also being performed. Thus, referring again to FIG. 10, the magnitude of the error on line 102, in conjunction with a positive indication on line 114, cause sequence control 104 to set the beam strength of the laser through control 90 and to then fire laser head 88. Duration control 84 is preset for a selected time and is otherwise not operative during this step. As the burn is being conducted, fork 10' is vibrated and its period measured by counter 60. This period is compared in comparator 98 with the desired period from register 100. When the error signal on line 102 falls within the required tolerance, sequence control 104 detects this and terminates the signal on line 134. This causes the burn to terminate. Finish lamp 110 is also ignited (step 112). While it is unlikely to occur, should this circuit respond to slowly to the equal indication, and the frequency of the fork become to high, a signal could appear on line 116 causing tuning error lamp 120 to be ignited (step 122).

When error lamp 120 is ignited, one of three things could be done with the fork. If the cost of the fork assembly is low enough, it might simply be thrown away. If possible, the fork assembly may be utilized in another application where tolerances are not quite as critical. If neither of the above is feasible, this system may, as indicated by dotted line 136, branch to step 138 during which a laser burn is performed in the throat area of the fork to lower its frequency to a value within the required tolerances. The disadvantages of this procedure are that it results in large instantaneous frequency errors due to the temperature coefficient elasticity of the material and the fact that the burn occurs in the area of maximum sensitivity to temperature. The reason for this is that it is in the throat area that the bends occurred during vibration and the elasticity of this area is thus critical.

While it is possible to branch directly to steps 130 and 132 from step 76, eliminating the course tuning of the center tine, the large amount of material which must be removed during these steps if this procedure were followed would cause transient problems to develop in the fork making accurate measurements difficult. The two step procedure outlined above is therefore believed to be preferable.

Referring back to step 64, it is seen that instead of bending outer tines 32, it is also possible to perform the preliminary tuning by removing material from these outer tines. If the decision is made to remove material, the operation normally branches from step 64 to step 140. During step 140, a determination is made of the amount of material which must be removed from each ear to raise the frequency by one-half the difference between the measured and desired frequency. The operation then branches to step 142 during which the determined amount of material is removed from each of the ears 132. As with step 82, this removal may be performed by a laser burn or by other techniques such as grinding, punching, drilling, cutting, or the like. From step 142, the operation proceeds to step 144 during which the frequency of the fork is again measured. As with previous frequency measuring steps, it is period rather than frequency which is actually measured. Since this is again a rough tuning step, and fairly wide tolerances are permitted, the system may proceed to step 76 if the measured value is equal to the desired value within fairly wide tolerances and, in fact, if there is any degree of confidence in the initial calculations, step 144 may be eliminated completely (see dotted line 145). If, for some reason, the amount of material removed is significantly lower than that required, or, if step 140 is eliminated completely (see dotted line 146) then the operation may proceed from step 144 back to step 142 to remove more material.

When retuning of fork 10' is required in the field all that is required is a period measuring counter 60 and a display 62. These may be relatively simple and inexpensive devices. The operations for field retuning would be basically the same as the operation 66, 68, 70, and 78 described above. These operations could be performed iteratively until the fork has been tuned to the desired frequency within the permitted tolerance.

While a number of techniques have been indicated above in addition to the laser burn technique for removing material from a tine or ear, the laser burn technique is preferable in that it leaves no mechanical stresses in the fork. The laser burn may, however, cause some warpage which, while not a problem with small areas such as tine 14 or ear 32, could present some minor problems if a burn was attempted over the entire length of leg 16 of tine 12. This, in addition to the greater sensitivity provided, are two of the principal considerations in favor of the preferred method diagrammed in FIG. 9 and discussed above.

A tuning fork structure has thus been provided which is particularly adapted for frequency adjustment within fine tolerances and for readjustment of frequency in the field. A method and apparatus for the adjustment and readjustment of tuning fork frequency within fine tolerances has also been provided. While this invention has been particularly shown and described above with reference to preferred embodiments thereof, it will be apparent to those skilled in the art that the foregoing and other changes in form and detail may be made therein without departing from the spirit and scope of the invention.

What is claimed is:

1. A method of tuning to a selected resonant frequency a vibrator structure
having first and second tine members and a base,
said tine members and base having their major surface areas lying at rest substantially in a common plane,
said first tine member being generally U-shaped and surrounding said second tine member,
wherein a tuning ear is formed on at least one of said tines, and
wherein said structure has a resonant frequency before tuning lower than said selected frequency, including the steps of:
measuring the frequency of said structure before tuning;
determining the difference between the measured and selected frequencies;
bending said tuning ear to raise the resonant frequency by approximately half the determined difference; and
removing material from the tine not having an ear until the frequency of said structure equals said selected frequency.

2. A method of the type described in claim 1 wherein the tine having the ear is said first tine and the tine from which material is removed is said second tine.

3. A method of the type described in claim 1 wherein said material removing step is performed by burning the material off with a laser.

4. A method of the type described in claim 1 wherein, during said material removing step, a selected small quantity of material is removed; and including the steps of:
measuring the resonant frequency of said structure after each performance of said burning step; and
repeating said material removing step and said measuring step until, during said measuring step, the frequency measured is said selected frequency.

5. A method of the type described in claim 1 wherein said removing material step includes the steps of removing a relatively large amount of material to coarsely raise the frequency to nearly said selected frequency, and then removing a small quantity of material to fine tune the structure to said selected frequency.

6. A method of the type described in claim 5 including the step of aging said structure between said coarse and fine material removal steps.

7. A method of the type described in claim 5 wherein said coarse tuning step includes the steps of determining the amount of material to be removed from said tine to raise the frequency to roughly said selected frequency, and laser burning the determined amount of material from the tine.

8. A method of the type described in claim 5 wherein said fine tuning step includes the steps of determining the amount of material to be burned from said tine to raise the frequency to precisely said desired frequency, and laser burning said desired quantity of material from the tine.

9. A method of the type described in claim 5 wherein said fine tuning step includes the steps of determining the frequency error after said coarse tuning step, utilizing said frequency error in controlling a laser burn on said tine, measuring the frequency of said structure during said laser burn, and terminating the burn when the measured frequency is equal to said selected frequency.

10. A method of the type described in claim 1 wherein said frequency measuring step is performed by measuring the period of said structure.

11. A method of the type described in claim 1 including the steps of:

measuring the frequency of said structure after said material removing step;

indicating an error if the frequency measured during said step is higher than said selected frequency; and laser burning material from an area near the throat of at least one of said tines to lower the frequency to the desired value.

12. A method of tuning to a selected resonant frequency a vibrator structure having first and second tine members and a base, said tine members and base each having its major surface areas normally lying in substantially common planes, said first tine member being generally U-shaped and surrounding said second tine member, a tuning ear being formed on at least one of said tines, the resonant frequency of said structure before tuning always being lower than said selected frequency; comprising the steps of:

measuring the frequency of said structure before tuning;

determining the difference between the measured and selected frequencies;

removing sufficient material from said tuning ear or ears to raise the resonant frequency of said structure by half the determined difference; and removing material from the tine not having an ear until the frequency of said structure equals said selected frequency.

13. A method of the type described in claim 12 wherein said material removal steps are performed by burning the material off with a laser.

* * * * *